Figure 1:
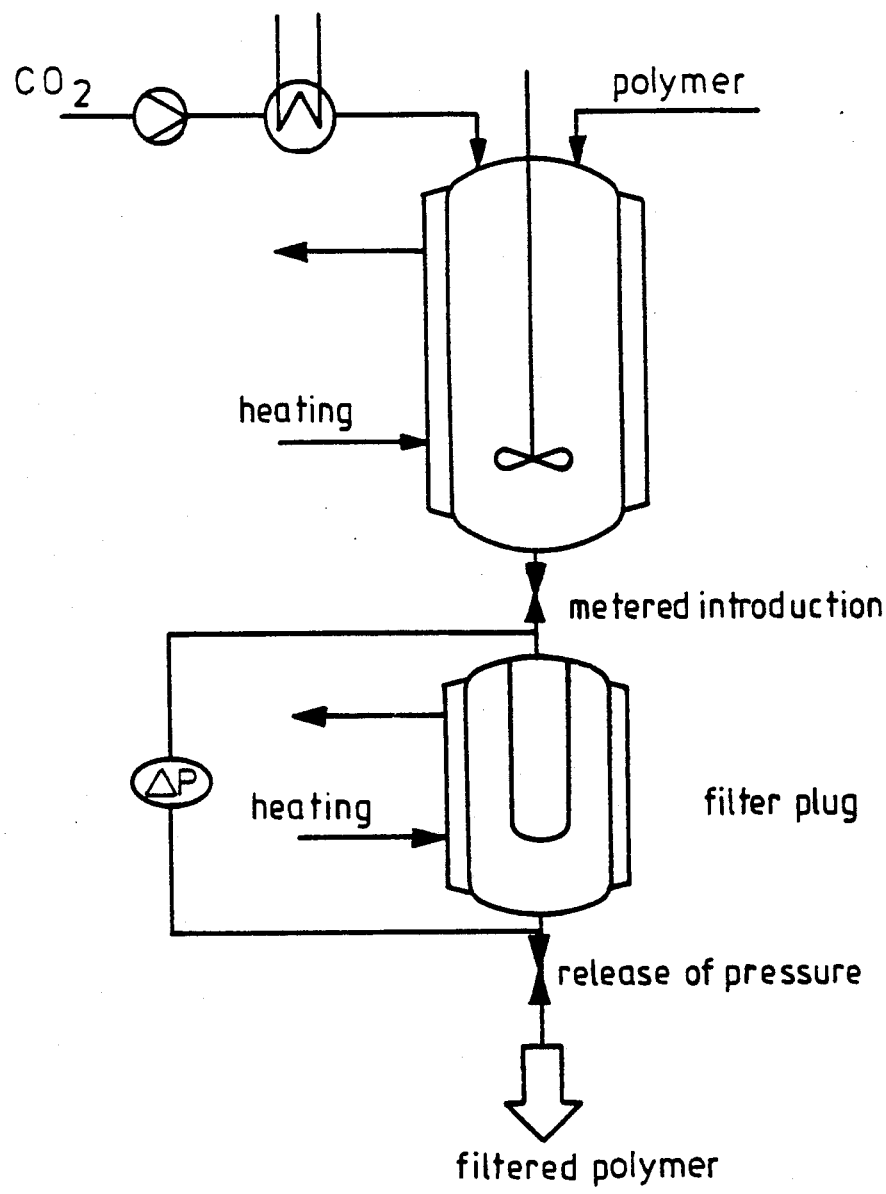

United States Patent [19]

Traechkner et al.

[11] Patent Number: 4,990,595
[45] Date of Patent: Feb. 5, 1991

[54] PROCESS FOR LOWERING THE MELT VISCOSITY OF AROMATIC POLYCARBONATES, AROMATIC POLYESTER CARBONATES AND AROMATIC AND/OR ARALIPHATIC POLYESTERS WITH SUPER-CRITICAL GASES

[75] Inventors: Hans-Joachim Traechkner, Krefeld; Karl-Dieter Löhr, Alpen; Wolfgang Wehnert, Krefeld; Claus Wulff, Krefeld; Wolfgang Arlt, Krefeld; Hanns-Ingolf Paul, Cologne, all of Fed. Rep. of Germany

[73] Assignee: Bayer Aktiengesellschaft, Leverkusen, Fed. Rep. of Germany

[21] Appl. No.: 393,724

[22] Filed: Aug. 15, 1989

[30] Foreign Application Priority Data

Aug. 30, 1988 [DE] Fed. Rep. of Germany ....... 3829293

[51] Int. Cl.$^5$ ...................... C08G 63/64; C08G 63/91

[52] U.S. Cl. .................................... 528/483; 525/439; 528/196; 528/481; 528/487; 528/491; 528/497; 528/498

[58] Field of Search ............... 528/483, 481, 487, 491, 528/497, 498, 196; 525/439

[56] References Cited

U.S. PATENT DOCUMENTS 4,252,968  2/1981  Govoni et al. ...................... 528/483

Primary Examiner—Harold D. Anderson
Attorney, Agent, or Firm—Connolly and Hutz

[57] ABSTRACT

By treating aromatic polycarbonates, aromatic polyester carbonates and aromatic and/or araliphatic polyesters in the molten state with super-critical gases or gas mixtures under pressure, the melt viscosity of these polymers is considerably lowered so that basic chemical operations which proceed only incompletely under the usual conditions can be carried out on these thermoplasts.

4 Claims, 3 Drawing Sheets

PROCESS FOR LOWERING THE MELT VISCOSITY OF AROMATIC POLYCARBONATES, AROMATIC POLYESTER CARBONATES AND AROMATIC AND/OR ARALIPHATIC POLYESTERS WITH SUPER-CRITICAL GASES

This invention relates to a process for lowering the melt viscosity of aromatic polycarbonates, aromatic polyester carbonates, and aromatic or araliphatic polyesters or mixtures of these polymers.

It is known that the melt viscosity of thermoplasts, which are preferably processed at high temperatures, may be lowered by a supply of thermal energy and/or by changing the polymer structure by mechanical action (shearing).

In polymers such as polycarbonates and aromatic polyesters, however, such a raising of temperature leads to irreversible thermal damage in the form of degradation reactions and discolourations.

Although it would be possible in principle to lower the viscosity by the addition of solvents to the thermoplast melt, it would be very difficult to remove the solvent completely after each basic operation.

Another disadvantage of the aforesaid method of lowering the melt viscosity of thermoplasts is that it results in thermal damage to the mechanical and optical properties of the polymers.

A process for lowering the melt viscosity of aromatic polycarbonates, aromatic polyester carbonates and aromatic and araliphatic polyesters and of mixtures thereof has now been found, characterised in that the polycarbonates, polyester carbonates, polyesters and mixtures thereof are treated in the molten state with super-critical gases or gas mixtures.

The process according to the invention is normally carried out by first melting the above mentioned polymers and then treating the melt with the super-critical gases or gas mixtures under pressure in apparatus suitable for this purpose. The treatment of the polymer melt with the super-critical gases or gas mixtures may be carried out by forcing the gas onto the polymer melt under pressure or mixing the melt with the gas under pressure, e.g. in a mixing screw or a static mixer.

The temperatures and pressures employed in the process according to the invention depend inter alia on the polymers or polymer mixtures used. The most suitable temperatures and pressures can easily be determined by preliminary tests.

The process according to the invention is generally carried out at temperatures of about 30° C. to 450° C., preferably 200° C. to 350° C. The pressures employed in the process according to the invention are generally about 25 to 350 bar, preferably 100 to 300 bar.

The following are gases which may be used in the super-critical state for the treatment of the above mentioned polymers: carbon dioxide, dinitrogen monoxide, chlorofluoro hydrocarbons, alkanes such as ethane and propane, cycloalkanes such as cyclohexane, tricyclo(5,2,1,0)-decane, cyclooctane and cyclododecane, alkenes such as ethene and propene, water and/or sulphur hexafluoride, especially carbon dioxide. The definition of the super-critical state of gases is known and is described in "The Properties of Gases and Liquids", by Reid, Sherwood and Prausnitz, McGraw Hill, New York, 1987.

The aromatic polycarbonates, polyester carbonates and polyesters to be treated are known and are described, for example, in U.S. Pat. No. 3,038,365, DOS Nos. 15 70 703 and 20 63 050, the monograph "H. Schnell, Chemistry and Physics of Polycarbonates, Interscience Publishers, New York, 1964" and U.S. Pat. No. 3,207,814, EP No. 10 840, DE Nos. 30 16019 and 27 14 544, U.S. Pat. No. 33 51 624 and DE No. 27 58 030.

The process according to the invention may also be carried out on mixtures of the above mentioned polymers with each other. Such mixtures of the above mentioned polymers are also known and are described in "Schwarz/Ebeling et al., Kunststoffverarbeitung, 2nd Edition, publishers Vogel Verlag 1981" and "Tadmor and Yogos, Principles of Polymer Processing, John Wiley & Sons Inc., New York, 1979".

The most suitable quantity of super-critical gases or gas mixtures to be used in any individual case may easily be determined by suitable preliminary tests. The quantity required depends inter alia on the nature of the super-critical gas or gas mixture to be used and on the nature of the polymers to be treated. For polycarbonantes, for example, carbon dioxide is used in an approximately 5 to 8 fold, preferably a 7 fold excess by weight over the polycarbonate.

One possible embodiment of the process according to the invention consists in that the polymer to be treated is melted in an autoclave and a super-critical gas is then added. The viscosity of the solution will drop suddenly, as may be detected from the energy on the stirrer shaft. The solution, which is now a thin liquid, may be cooled to protect the product and, when kept at constant pressure, is available for more easily carried out basic operations such as plastification, screening, mixing, dissolving, gassing, filtering, stirring, extracting, stripping, wetting, heating, cooling, evaporation and chemical reactions.

In another possible embodiment, the apparatus used is a mixing screw. This has the advantage over apparatus previously used, such as stirrer autoclaves or extraction columns, that melting of the polymer before contact with the super-critical gas, contacting of the polymer with the super-critical gas, separation of the super-critical gas and discharge of the polymer through a dieplate can be carried out in a single step. It is a particular advantage that the super-critical gas, which is contaminated with undesirable low molecular weight by-products, need not be removed through the die-plate of the screw apparatus but may be removed by way of an expansion dome. This renders after-treatment of the extracted polymer superfluous.

The screw may be operated continuously and it is a particular advantage of this process that the counter-flow principle between polymer and super-critical gas may be employed.

The viscosity of the polymers is considerably lowered by their treatment with super-critical gases or gas mixtures. Thus, for example, the viscosity of a polycarbonate at a temperature about 150 deg. cent. lower than the usual melting temperature of the polycarbonte may be lowered to that normally obtained at a temperature which is 150 deg. cent. higher. Due to the considerable lowering of the melt viscosity of the treated polymers it is possible, for example, to purify the polymers by a process of "melt filtration" though exceptionally fine mesh sieves. The low melt viscosity also enables fillers and/or reinforcing fibres to be incorporated in the polymers under particularly advantageous conditions. Further, the treatment of the polymers with super-critical carbon dioxide, for example, has an extraction effect which serves to separate undesirable low molecular weight substances such as solvents, monomers, oligomers and catalysts from the polymers.

It should also be mentioned as an advantage of the process according to the invention that different polymers, including those which react with each other by transesterification at the usual compounding temperatures, may easily be mixed together.

Further advantages of the process according to the invention are that the polymers can be filtered at a higher output rate, that they can be freed from undesirable low molecular weight impurities, that the polymers can be more easily mixed with inert additives such as glass fibres and inert fillers and that woven, knitted or non-woven fibrous fabrics can easily be impregnated with the polymers.

EXAMPLE 1

A bisphenol A polycarbonate ($M_n$: 15,000-150,000, relative viscosity: 1'15-2'5 determined in dichloromethane) (determined by method the mentioned described in DE-OS No. 2 063 050, in EP No. 10 840 and in DE-OS No. 3 016 019) was introduced into an autoclave with viewing window and melted at 320° C. A highly viscous melt was obtained. Carbon dioxide (an approximately 7 fold excess, based on the quantity of polycarbonate introduced) was then forced in under a pressure of 320 bar. The viscosity fell suddenly. The following values were obtained by altering the pressure and temperature:

| Pressure in bar | Temperature in °C. | Viscosity similar to that of: |
|---|---|---|
| 250-320 | 250-310 | glycol-glycerol |
| 200-280 | 170-260 | glycerol-honey |
| 100-250 | 150 | honey-highly viscous |
| 50-100 | 150 | highly viscous |

The table shows that acceptale flow conditions are still obtained for pure polycarbonate with carbon dioxide at a temperature 150° C. below the typical processing temperature. The viscosity was determined by an optical comparison with liquids of known viscosity.

EXAMPLE 2

1460 g of a bisphenol A polycarbonate and 1800 g of carbon dioxide were introduced into a 5 l autoclave. The mixture was heated to 257° C. under a pressure of 250 bar. After 15 minutes it was possible to switch on the magnetically driven stirrer, this being a sign that the polycarbonate had dissolved. The temperature was kept at 270° C. A filter plug of stainless steel was arranged in a pressuretight housing beneath the autoclave, said filter plug having a filtering surface of 1300 cm² and a pore width of 5 μm.

The housing containing the filter plugs was also brought to a pressure of 250 bar using carbon dioxide. Then the bottom valve of the autoclave was opened so that the polycarbonate dissolved in carbon dioxide could flow into the filter plug housing (see FIG. 1). A pressure drop of 10 bar was adjusted over the length of the filter plug and the solution was filtered in 12 mins., which means that the throughput was 6.25 kg/h, based on 1250 g of pure polycarbonate.

Figure 2:
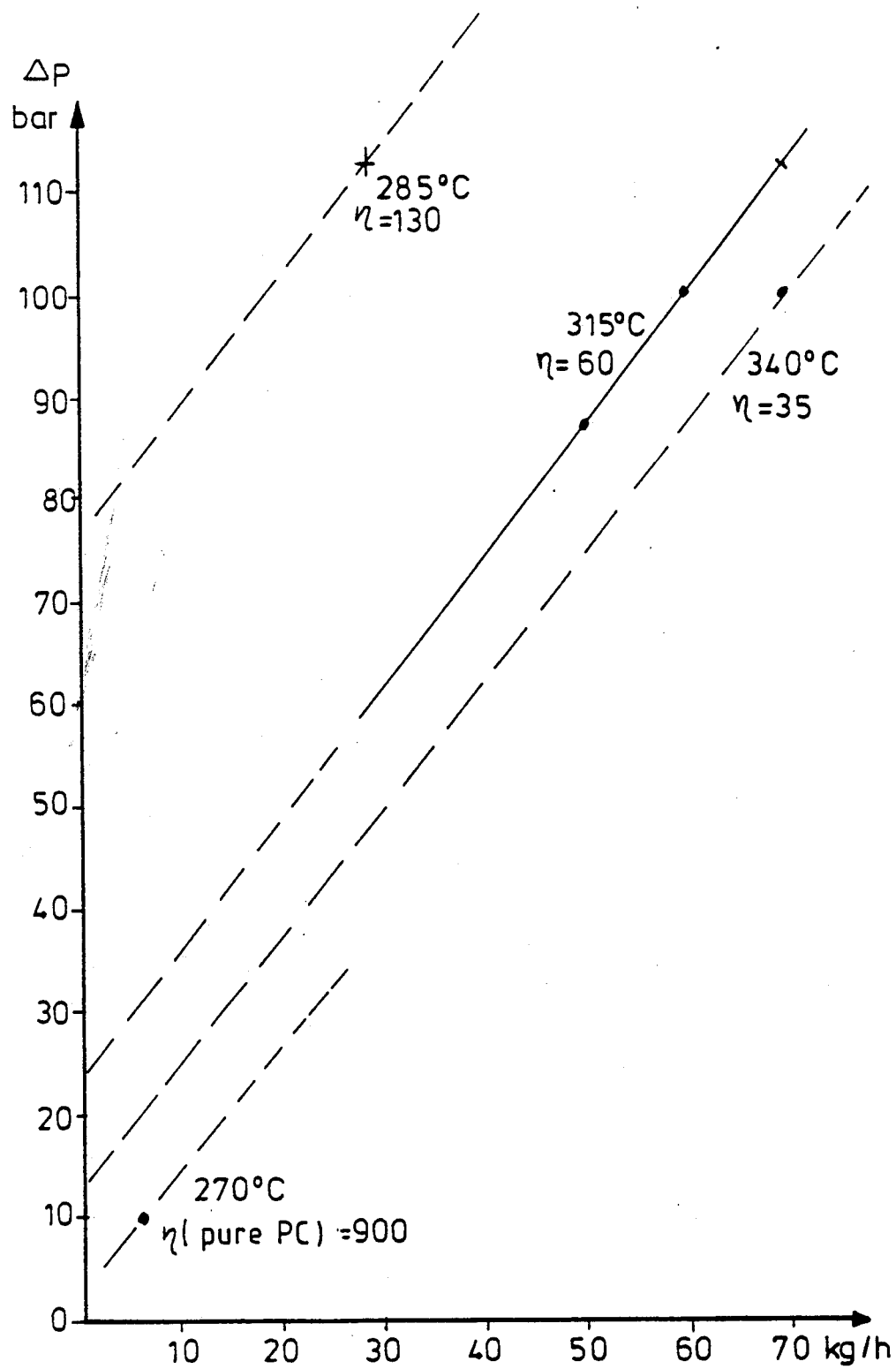

This measured point was marked in FIG. 2.

Pure polycarbonate, that is polycarbonate not containing any carbon dioxide, would have had a viscosity of 900 Pa.s and would consequently have required a pressure of 90 bar with the same throughput. This pressure differential does however lead to the formation of new swollen particles in the solution; even through it had actually been the aim of the filtration to free the solution from such phenomena. In order to evaluate this test comparative tests were carried out without carbon dioxide.

EXAMPLE 3

Comparative example

To demonstrate the advantages of the process a polycarbonate was filtered without carbon dioxide. In order to have one further relevant means of comparison a bisphenol A polycarbonate of lower molecular weight was used in contrast to the above example. It is characterised by a viscosity of 35 Pa.s at 1000 s$^{-1}$ at 270° C. and is thus about 30 times less viscous. The polycarbonate was melted in a screw extruder and filtered at various temperatures.

Test schedule: T=285°, 315° and 340° C.

The measured points are marked in FIG. 2. In addition the viscosities measured at 1000 s$^{-1}$ are recorded.

Evaluation

Without carbon dioxide the pressure differential to be applied over the length of the filter plug increases overproportionally with the increase in temperature. At 285° C. no technologically useful throughputs are possible.

The quantity passed through is a linear function of the pressure differential.

A viscosity of 130 Pa.s is the upper limit for carrying out the filtration without carbon dioxide. A viscosity of 900 Pa.s, which would be expected in Example 2 without carbon dioxide, does not allow filtration to be carried out.

Under supercritical conditions it is possible to use a method of procedure which is superior to melt filtration not only with respect to the throughput but also with respect to temperature.

EXAMPLE 4

In order to demonstrate the advantages offered by processing polymers at low temperatures by means of the process according to the invention a mixture of bisphenol A polycarbonate and polybutylene terephthalate and an additive were mixed at various temperature in a screw extruder. The result is recorded in FIG. 3.

A criterion for undesired side reactions is the decrease in dimensional stability under heat which is represented in this case in the form of the Vicat B temperature. The Vicat B temperature should preferably be high.

Figure 3:
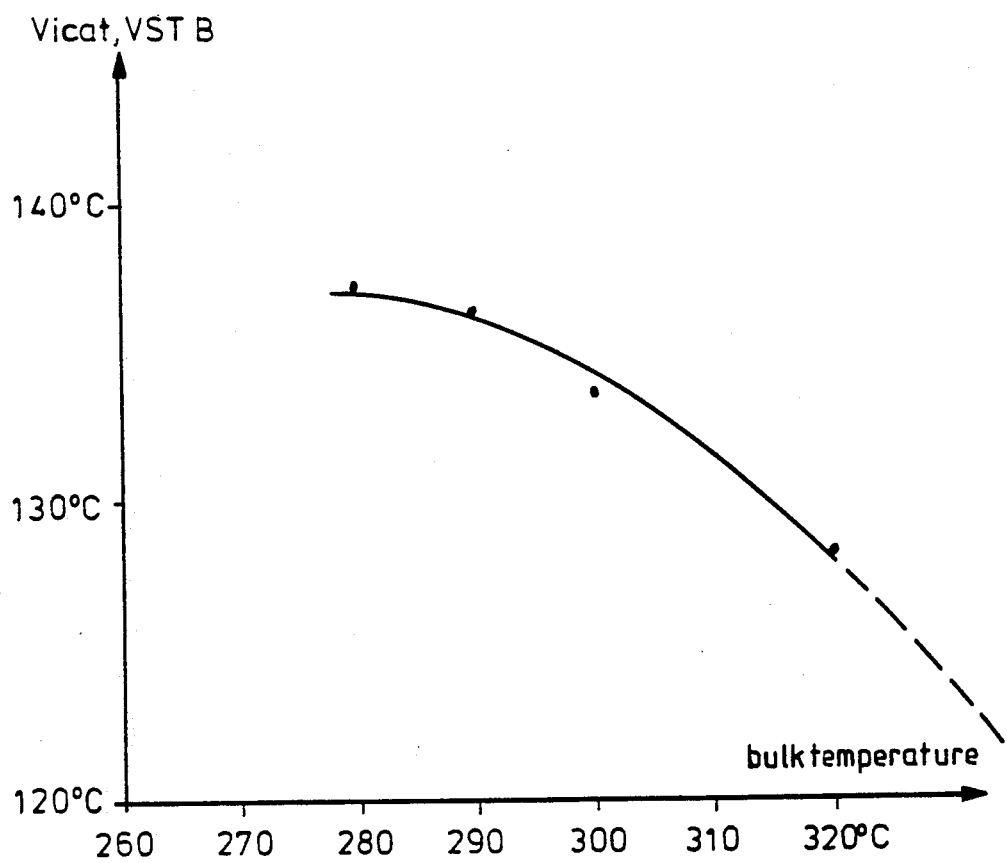

FIG. 3 shows that an overproportionate decrease in the Vicat temperature and thus an overproportionate increase in the side reaction can be observed as the temperature increases.

The advantage over the process hitherto known becomes clear on comparing the (extrapolated) Vicat temperatures:

|  | bulk temperature | Vicat B |
| --- | --- | --- |
| present process | 340 | 120 (extrapol.) |
| new process | 270 | 137 |

The present process does not permit any technologically useful throughputs at the advantageous bulk temperature of 270° C.

We claim:

1. Process for lowering the melt viscosity of aromatic polycarbonates, aromatic polyester carbonates or mixtures thereof with each other, characterised in that the polycarbonates, polyester carbonates, polyesters or mixtures thereof with each other are treated in the molten state with supercritical gases under pressure.

2. Process as claimed in claim 1, characterised in that the polycarbonates, polyester carbonates, polyesters or mixtures thereof are treated with super-critical gases at temperatures from 30° to 450° C.

3. Process according to claim 1, characterised in that the polycarbonates, polyester carbonates, polyesters or mixtures thereof are treated with super-critical gases at a pressure of from 25 to 350 bar.

4. Process according to claim 1, characterised in that the super-critical gases are selected from carbon dioxide, dinitrogen monoxide, chlorofluorohydrocarbons, alkanes, cycloalkanes, alkenes, sulfur hexafluoride or mixtures thereof.

* * * * *